United States Patent [19]
Mashino et al.

[11] Patent Number: 5,719,488
[45] Date of Patent: Feb. 17, 1998

[54] CHARGING GENERATOR AND VOLTAGE REGULATOR THEREFOR

[75] Inventors: Keiichi Mashino; Yuji Maeda; Sakae Hikita, all of Hitachinaka, Japan

[73] Assignees: Hitachi, Ltd., Tokyo; Hitachi Car Engineering Co., Ltd., Hitachinaka, both of Japan

[21] Appl. No.: 774,019

[22] Filed: Dec. 27, 1996

[30] Foreign Application Priority Data

Jan. 5, 1996 [JP] Japan ............................. 8-123

[51] Int. Cl.⁶ ............................................. H02J 7/14
[52] U.S. Cl. ........................... 322/28; 322/36; 322/99
[58] Field of Search ............................ 322/28, 36, 99

[56] References Cited

U.S. PATENT DOCUMENTS

| | | | |
|---|---|---|---|
| 4,084,126 | 4/1978 | Clements | 322/8 |
| 4,143,313 | 3/1979 | Arendt | 322/28 |
| 4,379,990 | 4/1983 | Sivers et al. | 322/99 |
| 4,985,670 | 1/1991 | Kaneyuki et al. | 322/28 |
| 5,512,813 | 4/1996 | Uchinami | 322/28 |
| 5,550,456 | 8/1996 | Shekhawat et al. | 322/25 |
| 5,606,246 | 2/1997 | Adachi | 322/8 |
| 5,617,011 | 4/1997 | Hammer et al. | 322/28 |

*Primary Examiner*—Thomas W. Dougherty
*Assistant Examiner*—Nicholas Ponomarenko
*Attorney, Agent, or Firm*—Antonelli, Terry, Stout, & Kraus, LLP

[57] ABSTRACT

The object of the invention is to provide a charging generator 1 which can avoid occurrence of overvoltage due to failure of equipment, which comprises: an a.c. generator 10 having armature windings 10a, 10b, 10c and a field winding 10d for generating an a.c.; a rectifier 11 having a plurality of power zener diodes 11a–11f having an intrinsic breakdown voltage Vz for converting the a.c. output from the armature windings to a d.c.; a current inhibit means which receives the d.c. output from the rectifier via field winding 10d and inhibits a field current which flows through the field winding; a voltage detection means for detecting a voltage of the d.c. output from the rectifier; and a voltage regulator 13, which includes a protection control means for controlling the current inhibit means in accordance with a result of judgment which is larger between a detected value of the d.c. voltage and a predetermined protection cut-off voltage VB, for regulating the d.c. voltage in the vicinity of the protection cut-off voltage VB by inhibiting the field current, and wherein the relationship between breakdown voltage Vz and protection cut-off voltage is set Vz>VB.

5 Claims, 4 Drawing Sheets

CHARGING GENERATOR AND VOLTAGE REGULATOR THEREFOR

BACKGROUND OF THE INVENTION

The present invention relates to a charging generator and a voltage regulator therefor, and in particular, it relates to a charging generator for use in an automobile for selectively supplying a low voltage or a high voltage.

A conventional generator for automobiles for supplying a high voltage and a low voltage selectively is disclosed in U.S. Pat. No. 4,084,126 in which an output voltage from the charging generator is switched between a low voltage (14.4 V) and a high voltage (40 V), the latter voltage being supplied to high voltage equipment.

Also, a conventional automotive voltage regulator to control the voltage supplied to an on-board vehicle network is disclosed in U.S. Pat. No. 4,143,313, in which an overvoltage protection circuit is provided.

The above-mentioned prior art charging generator and voltage regulator, however, have a problem in that, since a maximum output voltage is generated by the charging generator when supplying a high voltage, should there occur a breakdown in the high voltage load or in the voltage regulator circuit due to a high voltage surge or the like, a very high voltage (about 100 V) will be generated that cannot be dealt with solely by the conventional overvoltage protection circuit, thereby endangering the safety of anyone who happens to touch the high voltage equipment.

SUMMARY OF THE INVENTION

Thereby, the present invention has been developed to solve the above-mentioned problem associated with the prior art. The main object of the invention is, to provide a charging generator and a voltage regulator therefor having a twofold protection capability, combining protective features of a voltage regulator and a rectifier, in order to ensure prevention of any occurrence of overvoltage due to a failure of the equipment.

The charging generator for accomplishing the above-mentioned object of the invention is comprised of:

a generator having armature windings and a field winding for generating an a.c. output;

a rectifier having a plurality of rectifying elements, each having an intrinsic breakdown voltage $Vz$ (V), for converting an a.c. output which is supplied from the armature windings of the generator to a d.c. output; and a voltage regulator comprising current inhibit means connected to receive the d.c. output from the rectifier via the field winding of the generator for inhibiting a field current which flows through the field winding; a voltage detection means for detecting a voltage of the d.c. output from the rectifier; and a protection control means for controlling the current inhibit means in accordance with a judgment as to which value is greater between values of a detected voltage and a predetermined protection cut-off voltage $VB$ (V), thereby, to inhibit the field current such that the d.c. voltage is regulated at or below the protection cut-off voltage $VB$ (V), and wherein a relationship exists between the breakdown voltage $Vz$ (V) and the protection cut-off voltage $VB$ (V) such that $Vz>VB$.

Further, according to another aspect of the invention, the object of the invention is accomplished by providing a voltage regulator which is comprised of:

a field current input means for inputting therethrough a direct current which flows through a field winding, the direct current being converted from an alternating current, generated in an a.c. generator having armature windings and a field winding, in a rectifier having a plurality of rectifying elements each having an intrinsic breakdown voltage $Vz$ (Vv);

a current inhibit means for inhibiting the field winding current which is input through the field current input means;

a voltage detection means for detecting a voltage of the d.c. output from the rectifier; and a protection control means for controlling the current inhibit means according to a judgment as to which value is greater between the values of a voltage detected by the voltage detection means and of a predetermined protection cut-off voltage $VB(V)$, whereby the field current is inhibited such that the voltage level of the direct current which is converted from the alternating current in the rectifier is regulated below the protection cut-off voltage $VB$ (V), and wherein a relationship exists between the protection cut-off voltage $VB$ (V) and the breakdown voltage $Vz$ (V) such that $Vz>VB$.

According to another aspect of the invention, the occurrence of an overvoltage due to a failure of the equipment can be prevented.

PREFERRED EMBODIMENTS OF THE INVENTION

The above-mentioned and other features of the invention will be more clearly understood from the following descriptions of the preferred embodiments of the invention with reference to the accompanying drawings.

Figure 1:
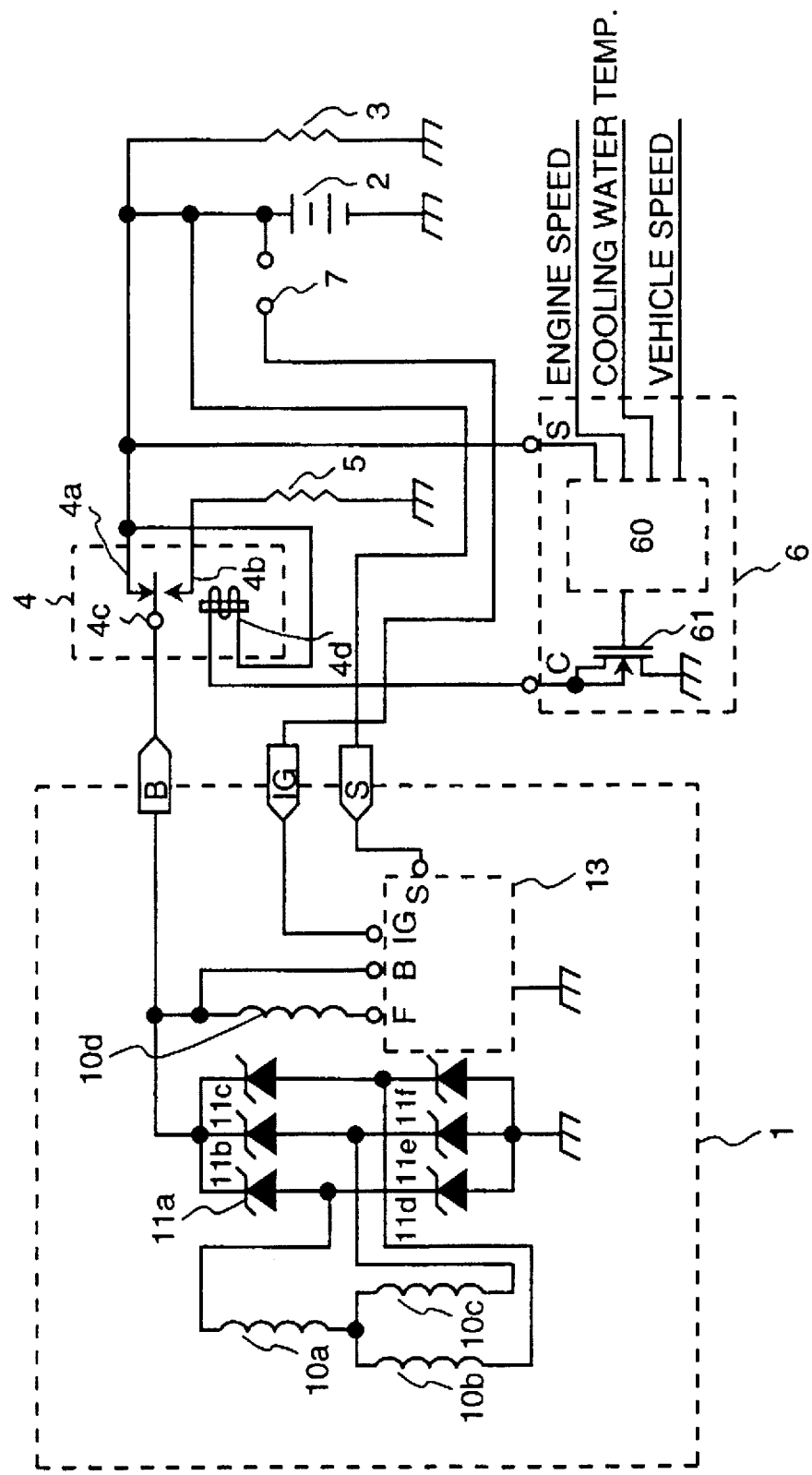
FIG. 1 is a schematic circuit diagram of an a.c. generator system according to one embodiment of the invention.

FIG. 1 is a schematic circuit diagram depicting a generating system including a charging generator according to one embodiment of the invention.

The generating system according to the one embodiment of the invention shown in FIG. 1 is comprised of a charging generator 1; a relay 4 for switching the power supplied from the generator 1 between a low voltage and a high voltage selectably to supply appropriate voltages to a low voltage load 3, including a head light and radio operable on 12 V, and to a high voltage load 5 for heating, for example, an electrically heated catalyst (EHC) for purifying engine exhaust gas; and a controller 6 for controlling the relay 4.

The charging generator 1 for use in an automobile, according to the one embodiment of the invention, has a including arrangement combining an a.c. generator 10, a rectifier 11 and a voltage regulator 13. In FIG. 1, the a.c.

generator 10 includes three-phase armature windings 10a, 10b and 10c in Y-connection, and a field winding 10d. The rectifier 11 is comprised of a three-phase full wave rectifying circuit having rectifying elements in the form of power zener diodes 11a, 11b, 11c, 11d, 11e and 11f, each having an intrinsic breakdown voltage of approximately 30 V.

The relay 4 which switches the generator's output is comprised of a normally closed contact 4a, a normally open contact 4b, a movable contact 4c, an armature coil 4d and the like. The controller 6 includes an arithmetic unit 60, a power MOS 61 and the like. Further, numeral 2 depicts a battery having a rated low voltage, and numeral 7 depicts a key switch which is operated by the driver to start or stop the engine (not shown in the drawing).

Figure 2:
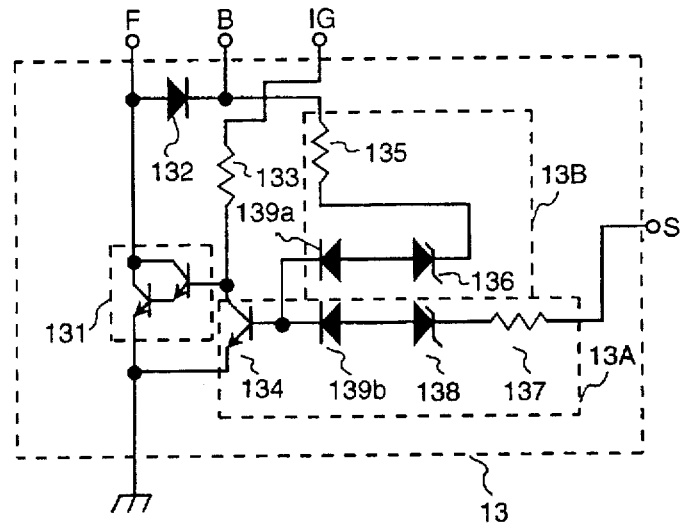
FIG. 2 is a schematic circuit diagram of a voltage regulator according to one embodiment of the invention.

FIG. 2 is a schematic circuit diagram depicting one form of the voltage regulator 13 according to the embodiment of the invention shown in FIG. 1. The voltage regulator 13 is comprised of a power transistor 131, a flywheel diode 132, a resistor 133, a main voltage detection circuit 13A, an auxiliary voltage detection circuit 13B, and terminals F, B, IG, S.

Further, the main voltage detection circuit 13A is comprised of a transistor 134, a resistor 137, a zener diode 138 and a diode 139b. The auxiliary voltage detection circuit 13B, which serves as the protection control means of the invention, is comprised of a resistor 135, a zener diode 136, a diode 139a and the transistor 134. The transistor 134 is shared by the main voltage detection circuit 13A and the auxiliary voltage detection circuit 13B.

By way of example, respective terminals B, IG and S of the charging generator 1 are electrically connected with corresponding terminals B, IG and S of the voltage regulator 13. The aforementioned combined arrangement of the charging generator 1, in which the a.c. generator 10, rectifier 11 and voltage regulator 13 are integrated, is not limited thereto, and the charging generator may take a different arrangement in which these components are provided separately or independently; nevertheless, the concept of the present invention is applicable to the voltage regulator thereof.

The operation of a system having the above-mentioned configuration will be described in detail in reference to FIGS. 1 and 2. When key switch 7 is closed, a voltage is applied from battery 2 to terminal IG of the charging generator 1, namely, to the IG terminal of voltage regulator 13. Then, a current flows via resistor 133 to the base of power transistor 131 in the voltage regulator 13, which consequently turns the power transistor 131 to the on-state, thereby causing a field current to flow in the field winding 10d.

In this condition, at first, the charging generator 1 starts to rotate when the motor is rotated by a starting device (which is not shown) and the engine starts its operation, which operation drives the charging generator to generate power being. An output of the power generated is supplied via terminal B of the charging generator 1 and through the normally closed contact 4a of relay 4 to battery 2 and low voltage electrical load 3, both on the low voltage side. At this time, since terminal S of charging generator 1, namely, terminal S of voltage regulator 13 is connected to the battery 2 and the low voltage electrical load 3, it can be said that a generated voltage V on the low voltage side is input via terminal S to the main voltage detection circuit 13A. In other words, a low voltage having been output externally from the charging generator 1 as the generated voltage V through terminal B of charging generator 1 and relay 4 can be said to be detected indirectly through terminal S of voltage regulator 13. Then, in dependency on a value of detected voltage on the low voltage side, the main voltage detection circuit 13A is operated as will be described below.

When the generated voltage V for the low voltage side detected at terminal S exceeds a predetermined value, zener diode 138 is caused to breakdown to turn transistor 134 to the on-state, and power transistor 131 is cut off. Thereby, the resulting field current flowing in field winding 10d and input through terminal F of voltage regulator 13, which is the field current input means, is caused to pass through flywheel diode 132, there to be attenuated so that the field current is inhibited. Thereby, the current inhibit means of this embodiment of the invention is comprised of power transistor 131 and flywheel diode 132.

When the field current is inhibited, the generated voltage V output from terminal B of the charging generator 1 decreases, as a result, a voltage on the low voltage side detected at terminal S becomes smaller than the predetermined value, thereby, zener diode 138 is caused to be non-conductive thereby causing transistor 134 to be cut-off, consequently turning power transistor 131 to the on-state, and thereby increasing the field current which flows through field winding 10d. By repeating the above-mentioned sequences, the generated voltage V, namely, the voltage on the low voltage side (detected at terminals B and S) is regulated to be maintained at a predetermined voltage, for example, at a constant value of 14.4 V in this embodiment of the invention.

Regulated voltage Vs, which is a generated voltage V regulated by the main voltage detection circuit 13A, is expressed by equation 1 as follows.

$$Vs = Vz(138) + Vf(139b) + VBE(134) \qquad \text{(Eq. 1),}$$

where, Vz(138): breakdown voltage (V) of zener diode 138, Vf(139b): forward voltage (v) of diode 139b, and VBE (134): voltage (V) across base and emitter of transistor 134.

Now, the control device 6 for controlling relay 4 for switching the power supply between the low voltage and high voltage will be described in the following.

Figure 3:
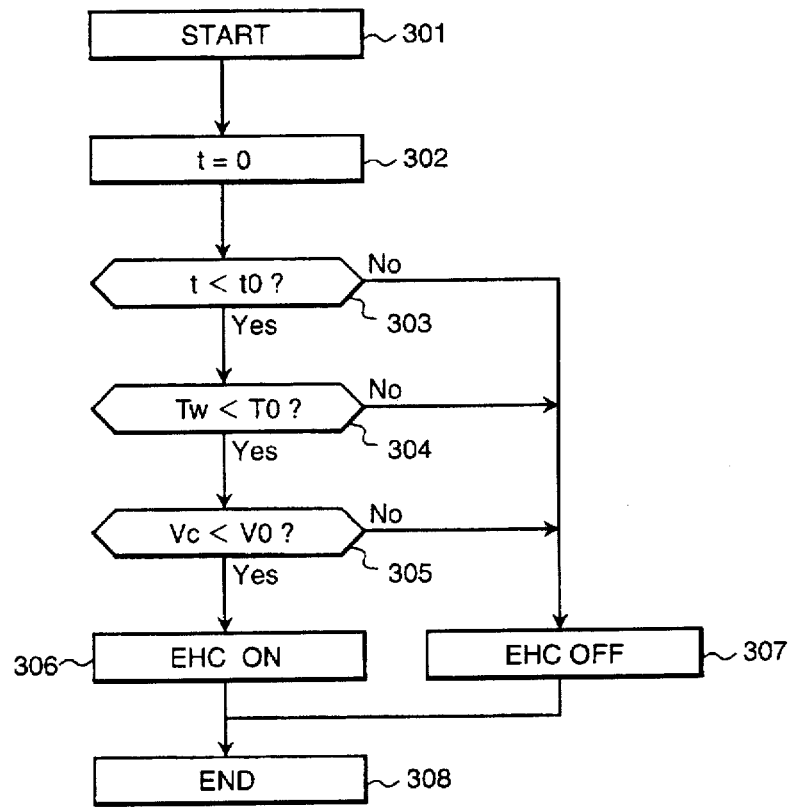
FIG. 3 is a flowchart indicative of the operation of a control device depicted in FIG. 1 according to one embodiment of the invention.

FIG. 3 is a flow chart indicative of operation of the control device according to the embodiment of the invention as shown in FIG. 1. More specifically, it indicates operation of the arithmetic unit 60 in the control device 6. At step 301 the operation starts, then, a timer is reset in step 302. From steps 303 to 305, it is judged whether or not to turn on a power supply to a high voltage electrical load 5 (heater EHC). In this embodiment of the invention, a power supply to the electrical load 5 will be turned on when all of the following conditions are met at the same time. (1) the elapsed time t after power-on is shorter than a preset time t0, (2) the cooling water's temperature Tw is lower than a preset temperature T0, and (3) the vehicle speed Vc is slower than a preset speed V0.

This setting implies that power to the high voltage electrical load 5 will be turned on only under such conditions that the engine is being warmed up and the exhaust gas is not being purified by the catalyst. After the engine has been warmed up, the foregoing conditions (1) or (3) will not apply exist, thereby, in step 307, the power supply to the high voltage electrical load 5 will be turned off.

When arithmetic unit 60 judges that the high voltage electrical load 5 should be supplied with power, power MOS 61 is turned on thereby causing a current to flow in excitation coil 4d of relay 4, thereby switching electrical contact between of the movable contact 4c to the normally open contact 4b. In this setting, terminal B of the charging generator 1 is connected to the high voltage electrical load 5. Battery 2 and electrical load 3 on the low voltage side are isolated from the charging generator 1, and so power the low voltage electrical load 3 is supplied only from battery 2.

Since the contact of relay 4 has been switched as described above, even when a generated voltage V at terminal B on the high voltage side becomes higher, a voltage on the low voltage side detected at terminal S (i.e., low voltage detection terminal) will not increase. Thereby, the power transistor 131 is constantly kept in the on-state, thereby allowing the charging generator 1 to increase its output voltage (generated voltage V) more and more. Thereby, the maximum rated voltage power supply that can be generated by the charging generator 1 is supplied to the high voltage electrical load 5.

However, the circuit of this embodiment of the invention has such a feature that, when an output voltage from the charging generator 1 increases, auxiliary voltage detection circuit 13b is operated in accordance with a value of voltage detected via "terminal B of voltage regulator 13" which is a voltage detection means for directly detecting generated voltage V of the d.c. output from rectifier 11. Namely, when a value of voltage on the high voltage side detected at terminal B (i.e., high voltage detection terminal) of voltage regulator 13 exceeds a preset protection cut-off voltage VB (V), a protection control means in FIG. 2, which is provided in the from of auxiliary voltage detection circuit 13B, triggers transistor 134 to the on-state via zener diode 136 in the auxiliary voltage detection circuit 13B, thereby operating the current inhibit means, including power transistor 131 and flywheel diode 132, so as to inhibit a the field current fed from terminal F. Thereby, voltage V generated by the charging generator 1 and detected at terminal B is regulated to correspond to voltage VB, which is expressed by equation 2 as follows. That is, the protection cut-off voltage VB at which the generated voltage V is to be regulated by auxiliary voltage detection circuit 13B is expressed by equation 2.

$$VB=Vz(136)+Vf(139a)+VBE(134) \qquad \text{Eq. 2,}$$

where, Vz(136): breakdown voltage (V) of zener diode 136, Vf (139a): forward voltage (V) of diode 139a.

In other words, it can be said that the voltage V generated by charging generator 1 can be limited to the protection cut-off voltage VB by setting each value of the voltages of Vz (136), Vf (139a) and VBE (134) to a predetermined value.

Suppose that voltage regulation becomes impossible while the relay 4 is switched to the high voltage side due to failure in voltage regulator 13, for example, due to a short circuit of power transistor 131. In this case, since the auxiliary voltage detection circuit 13b will not function, voltages induced in armature coils 10a, 10b, 10c will keep increasing, thereby resulting in a no-control status for the voltage V being generated. However, in practice, VBmax at terminal B, which is the voltage actually being generated, is suppressed by an equivalent circuit of FIG. 4 to a value expressed by equation 3.1.

$$VBmax\ (a,b)=Vz\ (11d)-Vf\ (11a) \qquad \text{Eq. 3.1,}$$

where, VBmax (a, b): a maximum voltage at terminal B as the voltage V actually being generated, assuming a maximum potential existing in armature coil 10a, and a minimum potential existing in 10c, Vz (11d): breakdown voltage (V) of power zener diode 11d, and Vf (11a): forward voltage (V) of power zener diode 11a.

Figure 4:
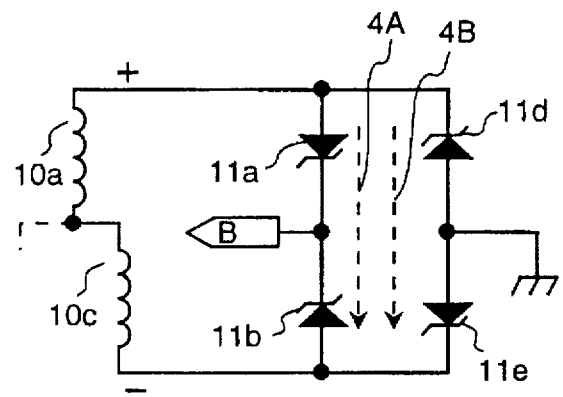
FIG. 4 is a schematic circuit diagram illustrative of the operation of the power zener diodes in FIG. 1.

FIG. 4 is a schematic diagram illustrative of the operation of the power zener diodes in FIG. 1. A short-circuit current flows in two routes (4A, 4B) as indicated by broken lines in FIG. 4. However, if a difference between the breakdown voltage and forward voltage is small, the quantities of current flowing through the two routes 4A, 4B will be the same.

The example of FIG. 4 represents an equivalent circuit for armature windings 10a and 10c in series connection for inhibiting a voltage generated therein by power zener diodes 11a, 11b, 11d and 11e connected thereto. The same applies to combinations of the armature windings of 10b and 10c, and armature windings 10a and 10b likewise. Each VBmax value in each combination can be expressed by the following equations similar to equation 3.1.

| | |
|---|---|
| VBmax (b,c)=Vz (11e)−Vf (11b) | Eq. 3.2 |
| VBmax (c,a)=Vz (11f)−Vf (11c) | Eq. 3.3 |
| VBmax (b,a)=Vz (11e)−Vf (11b) | Eq. 3.4 |
| VBmax (c,b)=Vz (11f)−Vf (11c) | Eq. 3.5 |
| VBmax (a,c)=Vz (11d)−Vf (11a) | Eq. 3.6. |

When the voltage generated in the armature windings is caused to change sequentially, the voltage VBmax at terminal B is inhibited to a voltage expressed by one of the equations 3.1 to 3.6. Thereby, a minimum voltage VBmin at terminal B is defined by a minimum value of voltage selected from respective voltages of VBmax at terminal B, and is expressed by the following equation 3.7.

$$VBmin=MIN\{VBmax\ (a,b),\ VBmax\ (b,a),\ VBmax\ (b,c),\ VBmax\ (c,b),\ VBmax\ (c,a),\ VBmax\ (a,c)\} \qquad \text{Eq. 3.7}$$

From the description above, it can be understood that a voltage V which can be generated by charging generator 1 within its rated capacity is limited by the breakdown voltage (V) and forward voltage (V), which are intrinsic to a group of power zener diodes 11a to 11f of rectifier 11 used in this embodiment of the invention.

On the other hand, when the voltage regulator 13 has not failed and is operating normally, the generated voltage V detected at terminal B is inhibited below protection cut-off voltage VB which is expressed by equation 2. Thereby, this protection cut-off voltage VB preferably get is to be lower than the minimum voltage VBmin of terminal B defined by equation 3.7. This is because that, when protection cut-off voltage VB is greater than the minimum voltage VBmin of terminal B, i.e., VB>VBmin, it is of no use for the protection of the charging generator 1 or the generator system. Namely, an excessive current will keep flowing through power zener diodes 11a–11f, and the power zener diodes will be destroyed by their continuous ohmic heating, thereby causing a failure of rectifier 11.

In order to prevent the occurrence of a failure in power zener diodes 11a–11f, it is necessary to maintain the following relationship of equation 4.

$$VBmin>VB \qquad \text{Eq. 4,}$$

More particularly, it is necessary to satisfy the following equation 5, which is derived from equations 3.1 to equation 4.

$$VBmin=MIN\{Vz\ (11a),\ Vz\ (11b),\ Vz\ (11c),\ Vz(11d),\ Vz\ (11e),\\ Vz\ (11f)\}-MAX\{Vf\ (11a),\ Vf\ (11b),\ Vf\ (11c),\ Vf\ (11d),\ Vf\\ (11e),\ Vf\ (11f)\}>VB \qquad \text{Eq. 5.}$$

The value of VBmin is obtained by subtracting the maximum forward voltage of power zener diodes 11a–11f from the minimum breakdown voltage of the power zener diodes 11a–11f.

In this embodiment of the invention, each value of the forward voltages Vf (11a)–Vf (11f) is approximately 1 V, which is negligibly small compared to a value of 30 V representing the breakdown voltages Vz (11a)–Vz (11f), and thereby equation 5 can be replaced by the following equation 6.

$$VBmin=Vzmin=MIN\{Vz(11a), Vz(11b), Vz(11c), Vz(11d), Vz(11e), Vz(11f)\}>VB \qquad \text{Eq. 6.}$$

That is, generally speaking, the forward voltage Vf is set to be substantially smaller than the breakdown voltage Vz, with the result that, assuming a subtraction by the forward voltage to be a safety factor which is so negligibly small that it can be omitted, a value of voltage VBmax at terminal B which is a generated voltage V can be shown to be determined by the breakdown voltage Vz of the power zener diodes 11a–11f, and more specifically, the minimum voltage VBmin across terminal B which is a generated voltage V can be understood to be determined by the minimum breakdown voltage Vzmin, which is a minimum value of of the breakdown voltage of power zener diodes 11a–11f.

The above description can be rephrased as follows. Equation 6 defines a relation wherein Vzmin>VB, and as long as equation 6 is satisfied, there will occur no breakdown in power zener diodes 11a–11f, thereby no short-circuit current will flow in the charging generator 1 during normal operation thereof, that is, unless voltage regulator 13 has failed. Then, in case the voltage regulator 13 should fail, the generated voltage V will be limited by protection cut-off voltage VB. Thereby, in either case, the voltage V generated by the charging generator 1 as a high voltage power supply is kept below the minimum breakdown voltage Vzmin.

Namely, a charging generator 1 capable of generating a high voltage, according to this embodiment of the invention, is provided with the following twofold safety measures:

(1) A high voltage generated to be supplied to a high voltage load is limited to a value of the protection cut-off voltage VB, (2) Even when the voltage regulator or the like has failed, voltage V generated by charging generator 1 is limited to a value below the breakdown voltage Vz of the power zener diodes; and, in addition, a further safety measure to avoid any risk of electric shock to the driver who happens to contact with the high voltage circuit is provided as follows, (3) Protection cut-off voltage VB (or breakdown voltage Vz) is set at a value which does not endanger the safety of the driver.

More particularly, a voltage preferred for the high voltage circuit is predetermined in a range which will not endanger the safety of anyone who happens to touch the circuit. The value of such safe voltage in the case of d.c. supply is preset at 72 V or less, is set at and more preferably, 48 V or less.

In the next step, respective diodes and transistors are selected, each having an intrinsic property corresponding to each voltage of Vz(136), Vf(139a) and VBE(134) indicated in equation 2 so as to be able to conform to this predetermined voltage. Then, power zener diodes having an intrinsic breakdown voltage Vz are selected as rectifier elements so as to be able to satisfy the relation of equation 6 that Vz>VB. By way of example, this sequence of selection may be reversed to achieve the same effect. Otherwise, the minimum breakdown voltage Vzmin may be adopted.

Figure 5:
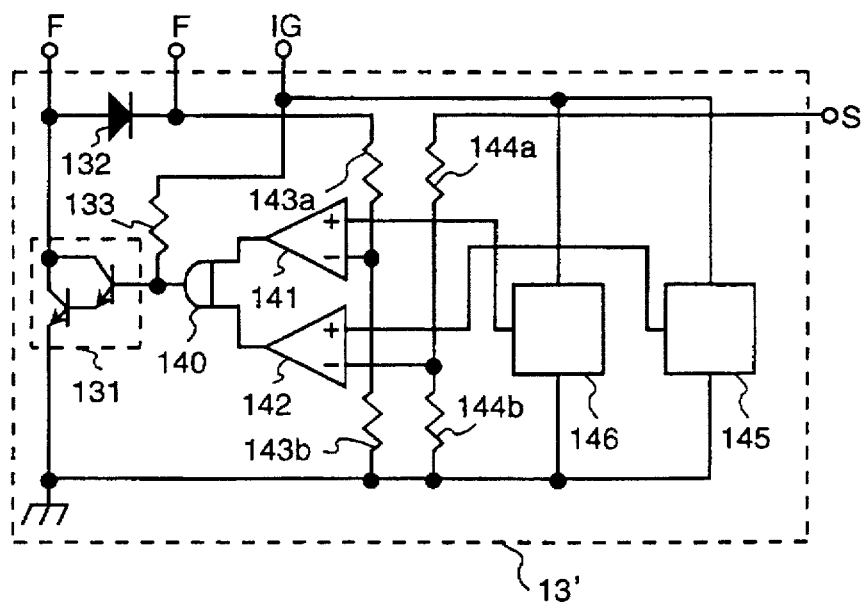
FIG. 5 is a schematic circuit diagram of a voltage regulator according to another embodiment of the invention.
Figure 6:
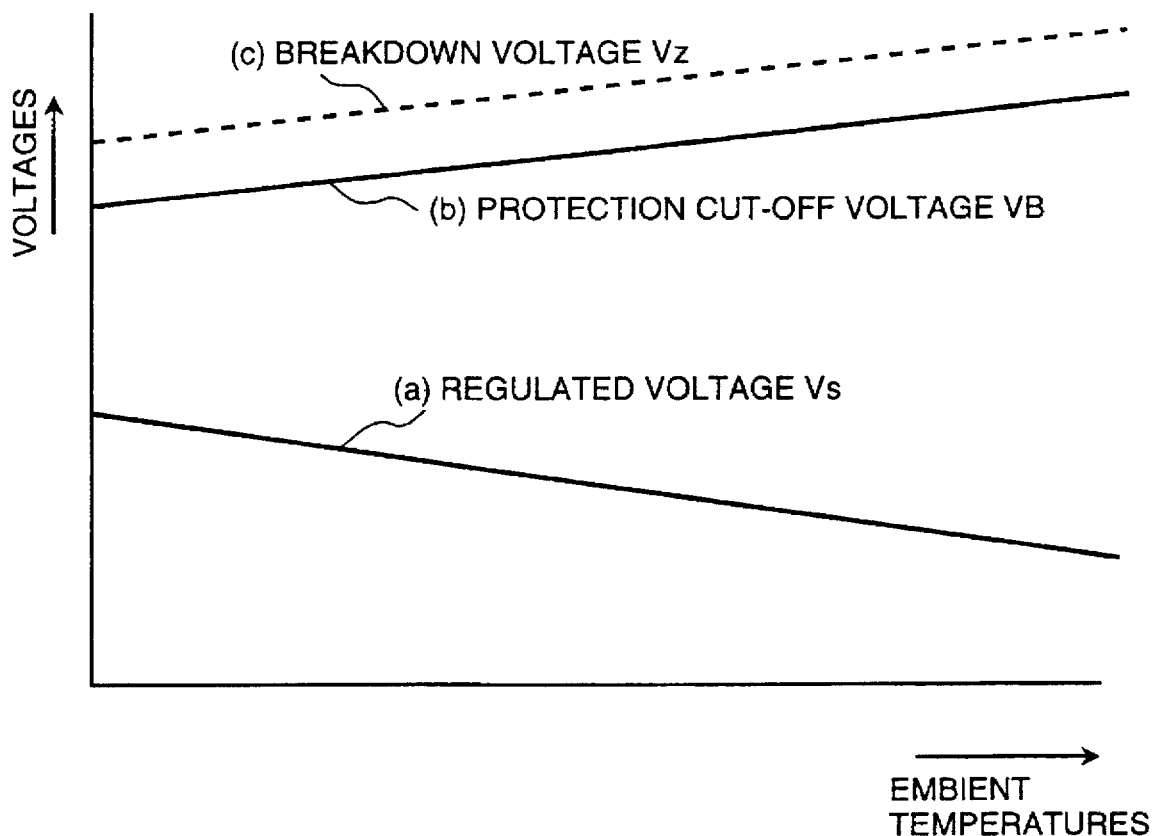
FIG. 6 is a diagram indicative of voltage characteristics relative to ambient temperatures of the voltage regulator.

With reference to FIGS. 5 and 6, another embodiment of the invention will be described.

FIG. 5 is a schematic circuit diagram of a voltage regulator according to another embodiment of the invention. In the voltage regulator 13' in the drawing of FIG. 5, power transistor 131, flywheel diode 132 and resistor 133 are the same as in the voltage regulator 13 of FIGS. 1 and 2.

In FIG. 5, comparator 142, dividing resistors 144a and 144b, and temperature detecting circuit 145 which has a negative temperature characteristic in combination constitute a main voltage detection circuit 13A of FIG. 2 for detecting a voltage on the low voltage side across terminal S. On the other hand, comparator 141, dividing resistors 143a and 143b, temperature detection circuit 146 which has a positive temperature characteristic, and AND gate 140 in combination constitute auxiliary voltage detection circuit 13B of FIG. 2 for detecting and regulating a voltage on the high voltage side across terminal S. By way of example, when the auxiliary voltage detection circuit 13B is not incorporated, provision of AND gate 140 is not necessary.

A description of the operation of the circuit having the configuration described above will be set forth in the following. When a voltage across terminal S becomes higher than a voltage Vs preset for regulation, an output from comparator 142 becomes "low", thereby, an output from AND gate 140 becomes "low", in consequence, power transistor 131 is cut off. On the other hand, also when a voltage across terminal B exceeds protection cut-off voltage VB the value of which is preset, an output from comparator 141 becomes "low", thereby, an output from AND gate 140 becomes "low", thereby the power transistor 131 is cut off.

FIG. 6 depicts voltage characteristics relative to ambient temperatures of the voltage regulator according to this embodiment of the invention.

As indicated by line (a) in FIG. 6, regulation voltage Vs is adapted to have such a property that voltage Vs increases with a decreasing ambient temperature and decreases with an increasing ambient temperature. Namely, it has a negative temperature gradient coefficient so as to be able to increase a charging current to the battery when the ambient temperature is low.

However, there are such cases where power zener diodes 11a–11f have a positive temperature gradient as its intrinsic temperature gradient coefficient with respect to its breakdown voltage Vz as indicated by dotted line (c) in FIG. 6.

Thereby, protection cut-off voltage VB indicated by line (b) in FIG. 6 is adapted to be able to correspond to such power zener diodes having a positive temperature gradient coefficient. Namely, by adapting a positive temperature property of temperature detection circuit 146 which is a temperature compensation means to match with the positive temperature gradient coefficient of the power zener diodes, the protection cut-off voltage VB is adapted to have a low value at a low ambient temperature and have a high value at a high ambient temperature. In other words, voltage regulator 13' is provided with temperature compensation means for compensating protection cut-off voltage VB (V) which is regulated by the voltage regulator 13' such that variations of the cut-off voltage VB due to changes of ambient temperatures correspond to changes in the intrinsic property of the breakdown voltage Vz (V) of the power zener diodes due to the changes in the ambient temperatures.

According to the above-mentioned embodiment of the invention, the protection cut-off voltage VB which is regulated and fed to the high voltage electrical load 5 can be set at the maximum voltage in the vicinity of the intrinsic breakdown voltage Vz (or minimal breakdown voltage Vzmin) of the power zener diodes, thereby, a power supply to be fed to the high voltage electrical load 5 can be increased to a maximum rated voltage. For example, when the high voltage electrical load 5 is an electric heater for heating a catalyst which purifies engine exhaust gases, the catalyst can be heated quickly after start-up of the engine, thereby effectively and quickly removing hazardous materials from the exhaust gases.

Nevertheless, it is desirable for the protection cut-off voltage VB to be set at a voltage which will not endanger the safety of the driver who happens to touch the high voltage circuit.

What is claimed is:

1. A charging generator comprising:

an a.c. generator having armature windings and a field winding for generating an alternating current;

a rectifier for rectifying said alternating current output from said armature windings to produce a direct current in a rectifying circuit thereof including a plurality of rectifying elements each having an intrinsic characteristic of breakdown voltage $Vz(V)$; and a voltage regulator including current inhibit means connected to receive said direct current output from said rectifier via said field winding for inhibiting a field current which flows through said field winding; voltage detection means for detecting a d.c. voltage of said direct current output from said rectifier; and protective control means for controlling said current inhibit means in accordance with a judgment of which value is larger between a value of said detected voltage and a predetermined protection cut off voltage $VB(V)$ thereby to inhibit said field current such that said d.c. voltage is regulated at or below said protection cut off voltage $VB(V)$, wherein a relationship exists between said breakdown voltage $Vz(V)$ and said protection cut off voltage $VB(V)$ such that $Vz>VB$.

2. A charging generator according to claim 1 wherein when a minimum value of a plurality of breakdown voltages Vz which are intrinsic to each of said plurality of rectifying elements is designated as a minimum breakdown voltage Vzmin (V), there holds a relationship that $Vzmin>VB$.

3. A charging generator according to claim 1 wherein said voltage regulator further comprises temperature compensation means for compensating for a fluctuation of voltages due to ambient temperature changes of said protection cut off voltage VB (V) which is regulated by said voltage regulator such that said fluctuation of voltages is compensated substantially to equal a fluctuation of said intrinsic characteristics due to the ambient temperature changes of said breakdown voltages Vz (V) which are intrinsic to said rectifying elements.

4. A voltage regulator for use with a charging generator having armature windings and a field winding to generate an alternating current, comprising:

field current input means for inputting a field current which flows through said field winding, said field current being a d.c. current which has been converted in a rectifier having a plurality of rectifying elements each having an intrinsic characteristic of breakdown voltage Vz (V);

current inhibit means for inhibiting said field current input from said field current input means;

a voltage detection means for detecting a voltage of said d.c. output from said rectifier; and a protective control means for controlling said current inhibit means on the basis of a judgment of which value is larger between a detected value of the voltage detected by said voltage detection means and a predetermined protection cut off voltage VB (V), thereby said field current is inhibited such that said d.c. voltage converted in said rectifier is regulated at or smaller than said protection cut off voltage VB (V), and wherein said protection cut off voltage VB (V) is maintained relative to said breakdown voltage Vz(V) in a relationship such that $Vz>VB$.

5. A charging generator according to claim 1, further comprising a switching relay for switching an output from said charging generator between a low voltage load and a high voltage load, and a control means for controlling said switching relay.

* * * * *